United States Patent
Dibenedetto et al.

(10) Patent No.: US 10,570,762 B2
(45) Date of Patent: Feb. 25, 2020

(54) VANE STRUT POSITIONING AND SECURING SYSTEMS INCLUDING LOCKING WASHERS

(71) Applicant: UNITED TECHNOLOGIES CORPORATION, Farmington, CT (US)

(72) Inventors: Enzo Dibenedetto, Kensington, CT (US); Matthew E. Bintz, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 743 days.

(21) Appl. No.: 14/713,002

(22) Filed: May 15, 2015

(65) Prior Publication Data
US 2016/0333727 A1 Nov. 17, 2016

(51) Int. Cl.
| | | |
|---|---|---|
| *F01D 9/04* | (2006.01) | |
| *F01D 17/16* | (2006.01) | |
| *F16B 39/282* | (2006.01) | |
| *F16B 2/00* | (2006.01) | |
| *F16B 43/00* | (2006.01) | |

(Continued)

(52) U.S. Cl.
CPC .......... *F01D 9/042* (2013.01); *F01D 17/162* (2013.01); *F16B 39/282* (2013.01); *F05D 2250/28* (2013.01); *F05D 2250/29* (2013.01); *F05D 2300/211* (2013.01); *F05D 2300/2112* (2013.01); *F05D 2300/2282* (2013.01); *F16B 2/005* (2013.01); *F16B 5/02* (2013.01);

(Continued)

(58) Field of Classification Search
CPC ..... F01D 9/00; F01D 9/02; F01D 9/04; F01D 9/042; F01D 17/12; F01D 17/14; F01D 17/162; F01D 17/167; F01D 25/246; F16B 39/24
USPC .................................. 470/42, 163; 411/160
See application file for complete search history.

(56) References Cited

U.S. PATENT DOCUMENTS

| | | | | |
|---|---|---|---|---|
| 4,808,069 A | * | 2/1989 | Bonner ................ | F01D 17/162 384/435 |
| 5,328,327 A | * | 7/1994 | Naudet ................ | F01D 17/162 29/889.22 |

(Continued)

FOREIGN PATENT DOCUMENTS

| | | |
|---|---|---|
| EP | 1205638 A2 | 5/2002 |
| EP | 2108787 A2 | 5/2002 |

(Continued)

OTHER PUBLICATIONS

European Search Report for EP Application No. 16 16 0436.
EP Office Action for Application No. 16 160 436.8 dated Oct. 4, 2019.

*Primary Examiner* — Brian P Wolcott
(74) *Attorney, Agent, or Firm* — Cantor Colburn LLP

(57) ABSTRACT

A vane strut positioning and securement system includes a housing including a washer aperture defined in an inner diameter thereof and a lock washer disposed within the washer aperture of the housing, the lock washer configured to lock a vane strut orientation under compression against a vane strut washer. The washer aperture is defined partially through a thickness of the housing, and the housing includes a strut post opening defined through the housing from the inner diameter to an outer diameter of the housing.

17 Claims, 3 Drawing Sheets

(51) Int. Cl.
  *F16B 5/02* (2006.01)
  *F16B 39/22* (2006.01)
  *F16B 39/24* (2006.01)

(52) U.S. Cl.
  CPC ............ *F16B 39/225* (2013.01); *F16B 39/24* (2013.01); *F16B 43/00* (2013.01); *Y02T 50/673* (2013.01)

(56) References Cited

U.S. PATENT DOCUMENTS

| | | | | |
|---|---|---|---|---|
| 6,413,043 | B1* | 7/2002 | Bouyer | F01D 9/042 29/451 |
| 7,445,427 | B2* | 11/2008 | Gutknecht | F01D 17/162 415/160 |
| 7,661,925 | B2* | 2/2010 | Lejars | F01D 17/162 415/161 |
| 7,722,318 | B2* | 5/2010 | Addis | B23P 6/005 415/148 |
| 9,404,374 | B2* | 8/2016 | Addis | B23P 6/005 |
| 2013/0170922 | A1* | 7/2013 | Persson | B21D 53/22 411/161 |

FOREIGN PATENT DOCUMENTS

| | | | |
|---|---|---|---|
| EP | 1672231 | A1 | 6/2006 |
| EP | 1959094 | A2 | 8/2008 |

\* cited by examiner

_US 10,570,762 B2_

VANE STRUT POSITIONING AND SECURING SYSTEMS INCLUDING LOCKING WASHERS

STATEMENT OF GOVERNMENT RIGHTS

This invention was made with government support under contract no. FA-8650-09-D-2923-0021 awarded by the Air Force. The government has certain rights in the invention.

BACKGROUND

1. Field

The present disclosure relates to turbomachine vanes, more specifically to mounting systems for vane struts.

2. Description of Related Art

In certain gas turbine engines, a plurality of variable vanes having a strut-flap design can be utilized to properly direct air flow to downstream airfoils which can enhance performance. The gap between the upstream strut and the downstream flap of each vane typically needs to be very small to prevent unacceptable leakage from the high pressure side to the low pressure side thereof. This can be achieved by individual custom fabrication having very low tolerances, but such solutions are not proven cost effective in a production environment.

Such conventional methods and systems have generally been considered satisfactory for their intended purpose. However, there is still a need in the art for improved strut positioning and securement systems. The present disclosure provides a solution for this need.

SUMMARY

In accordance with at least one aspect of this disclosure, a vane strut positioning and securement system includes a housing including a washer aperture defined in an inner diameter thereof and a lock washer disposed within the washer aperture of the housing, the lock washer configured to lock a vane strut orientation under compression against a vane strut washer. The washer aperture is defined partially through a thickness of the housing, and the housing includes a strut post opening defined through the housing from the inner diameter to an outer diameter of the housing.

In a further embodiment of any of the foregoing embodiments, the lock washer may additionally and/or alternatively include a flat portion including a compression lock interface. The flat portion can be annular or any other suitable shape.

In a further embodiment of any of the foregoing embodiments, the compression lock interface may additionally and/or alternatively include any suitable material that is harder than a strut washer such that the strut washer deforms under compression against the compression lock interface of the lock washer.

In a further embodiment of any of the foregoing embodiments, the compression lock interface may additionally and/or alternatively include at least one of knurling, radial serrations, cubic boron nitride coating, aluminum oxide coating, colloidal silica, or any other suitable interface (e.g., gritty media).

In a further embodiment of any of the foregoing embodiments, the compression lock interface may additionally and/or alternatively be defined on less than all of the flat portion.

In a further embodiment of any of the foregoing embodiments, the lock washer may additionally and/or alternatively include at least one channel defined in the flat portion.

In a further embodiment of any of the foregoing embodiments, the strut post opening may additionally and/or alternatively be defined through a center of the lock washer aperture.

In a further embodiment of any of the foregoing embodiments, the lock washer may additionally and/or alternatively include a post portion configured to fit within the strut post opening and to allow a vane post to be inserted therethrough.

In a further embodiment of any of the foregoing embodiments, the system may additionally and/or alternatively include a vane strut defining a leading edge of a vane airfoil, wherein the strut can include a strut post and a strut washer disposed in a strut washer aperture thereof, wherein the strut post can include threading on an outer surface thereof and is configured to mate with a locking nut to compress the vane strut to the housing.

In a further embodiment of any of the foregoing embodiments, the lock washer may additionally and/or alternatively be press fit into the washer aperture.

In a further embodiment of any of the foregoing embodiments, the strut washer may additionally and/or alternatively can be press fit into the strut washer aperture.

In accordance with at least one aspect of this disclosure, a turbomachine for an aircraft includes a housing as described above, a vane including a vane strut as described above, a vane flap movably mounted relative to the vane strut and the housing to change an aerodynamic shape of the vane, and a lock washer as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
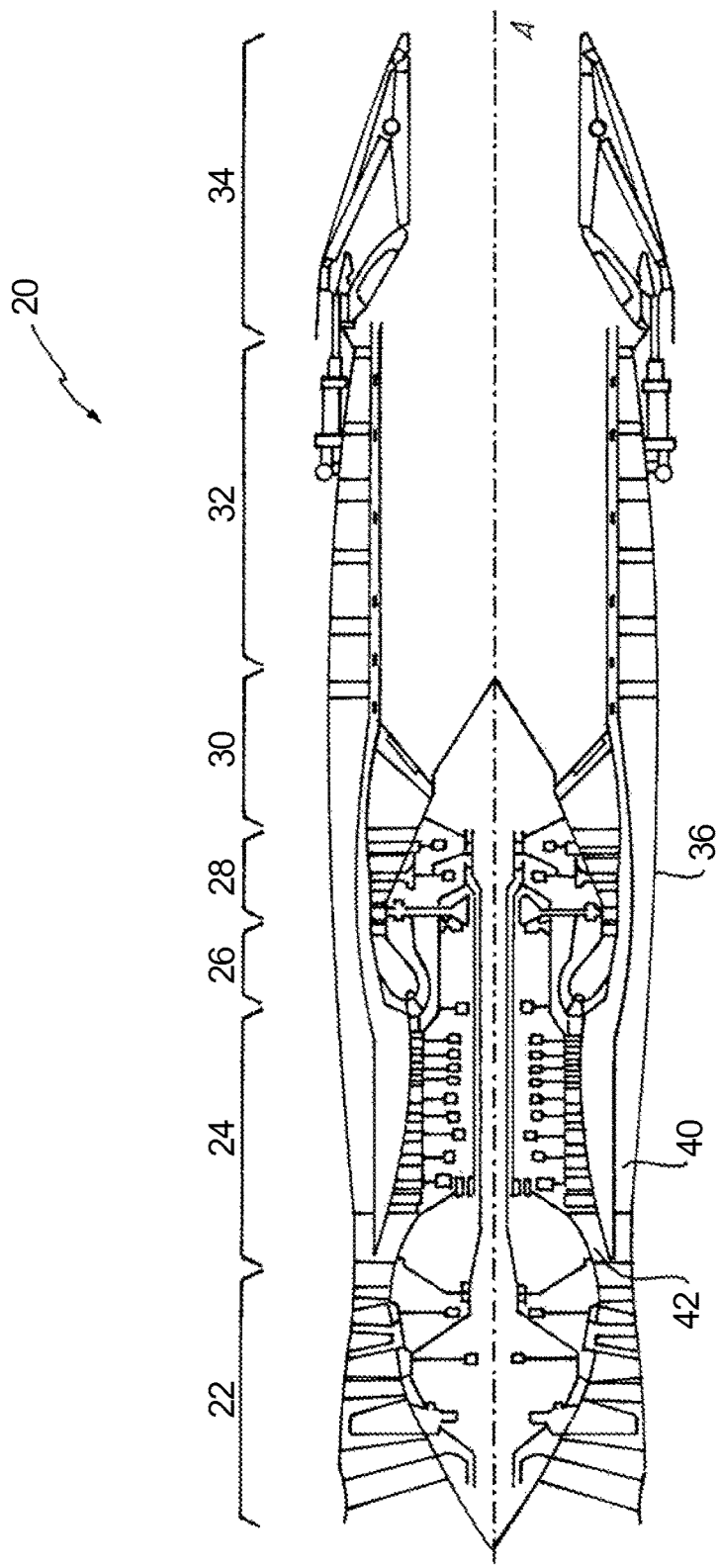
FIG. 1 is a schematic view of an embodiment of a turbomachine in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 2 and is designated generally by reference character 200. Other embodiments and/or aspects of this disclosure are shown in FIGS. 1-4. The systems and methods described herein can be used to position and secure a vane strut in a predetermined position relative to a vane flap.

Figure 2:
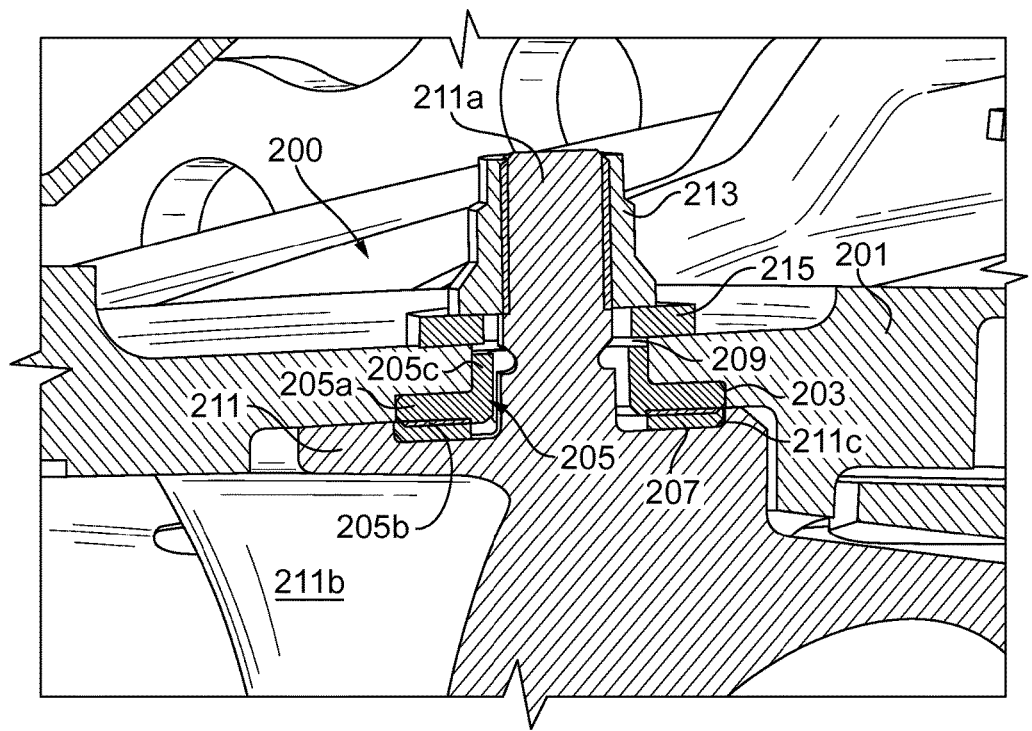
FIG. 2 is a cross-sectional view of a portion of an embodiment of a system in accordance with this disclosure, showing an embodiment of a vane strut attached to a housing and fixed in position by a lock washer.

FIG. 1 schematically illustrates an embodiment of a gas turbine engine 20. The gas turbine engine 20 is disclosed herein as a two-spool low-bypass augmented turbofan that generally incorporates a fan section 22, a compressor section 24, a combustor section 26, a turbine section 28, an augmenter section 30, an exhaust duct section 32, and a nozzle system 34 along a central longitudinal engine axis A. Although depicted as an augmented low bypass turbofan in the disclosed non-limiting embodiment, it should be understood that the concepts described herein are applicable to other gas turbine engines including non-augmented engines, geared architecture engines, direct drive turbofans, turbojet, turboshaft, multi-stream variable cycle adaptive engines and other engine architectures. Variable cycle gas turbine engines power aircraft over a range of operating conditions and essentially alter a bypass ratio during flight to achieve countervailing objectives such as high specific thrust for high-energy maneuvers yet optimize fuel efficiency for cruise and loiter operational modes.

An engine case structure 36 defines a generally annular secondary airflow path 40 around a core airflow path 42. It should be appreciated that various components, individually and collectively, may define the engine case structure 36 that essentially defines an exoskeleton to support the rotational hardware.

Air that enters the fan section 22 is divided between a core airflow through the core airflow path 42 and a secondary airflow through a secondary airflow path 40. The core airflow passes through the compressor section 24, combustor section 26, the turbine section 28, then the augmentor section 30 where fuel may be selectively injected and burned to generate additional thrust through the nozzle system 34. It should be appreciated that additional airflow streams such as third stream airflow typical of variable cycle engine architectures may additionally be sourced from the fan section 22.

The secondary airflow may be utilized for a multiple of purposes to include, for example, cooling and pressurization. The secondary airflow as defined herein may be any airflow different from the core airflow. The secondary airflow may ultimately be at least partially injected into the core airflow path 42 adjacent to the exhaust duct section 32 and the nozzle system 34.

The exhaust duct section 32 may be circular in cross-section as typical of an axisymmetric augmented low bypass turbofan or may be non-axisymmetric in cross-section to include, but not be limited to, a serpentine shape to block direct view to the turbine section 28. In addition to the various cross-sections and the various longitudinal shapes, the exhaust duct section 32 may terminate in a Convergent/Divergent (C/D) nozzle system, a non-axisymmetric two-dimensional (2D) C/D vectorable nozzle system, a flattened slot nozzle of high aspect ratio or other nozzle arrangement.

In accordance with at least one aspect of this disclosure, referring to FIG. 2, a vane strut positioning and securement system 200 includes a housing 201 including a washer aperture 203 defined in an inner diameter thereof and a lock washer 205 disposed within the washer aperture 203 of the housing 201. The washer aperture 203 is defined partially through a thickness of the housing 201. The housing 201 also includes a strut post opening 209 defined through the housing 201 from the inner diameter to an outer diameter of the housing 201.

Figure 3A:
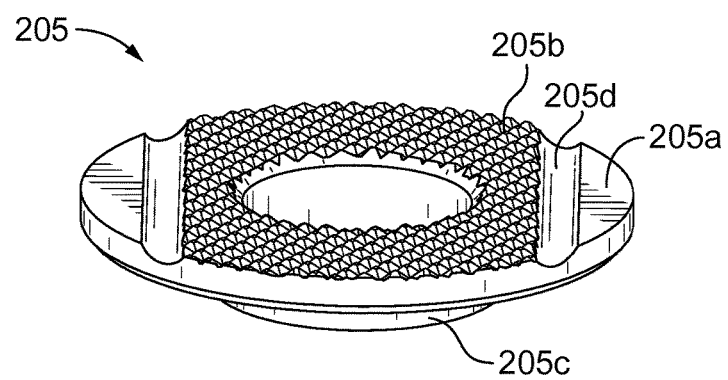
FIG. 3A is a perspective view of an embodiment of a lock washer in accordance with this disclosure.
Figure 3B:
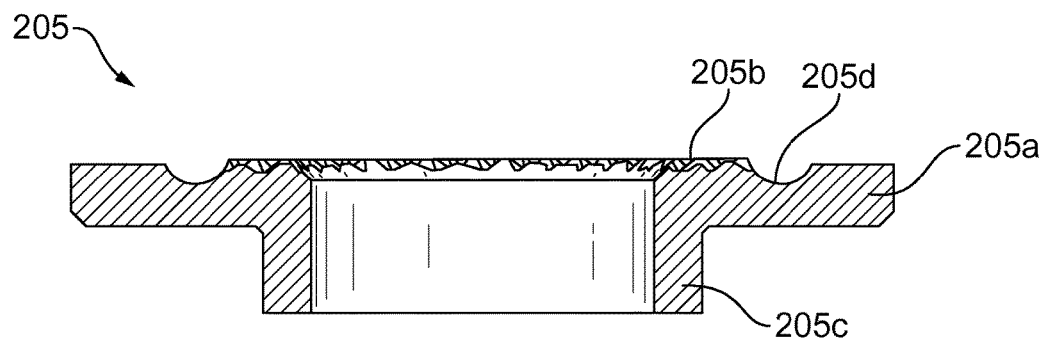
FIG. 3B is a cross-sectional elevation view of the lock washer of FIG. 3A.

The lock washer 205 is configured to lock a vane strut orientation under compression against a vane strut washer 207. Referring additionally to FIGS. 3A and 3B, the lock washer 205 can include a flat portion 205a including a compression lock interface 205b that is formed on and/or from the flat portion 205a. The flat portion 205a can be annular or any other suitable shape (e.g., square, rectangular).

In certain embodiments, the lock washer 205 can be press fit into the washer aperture 203, however, any suitable method of affixing the lock washer 205 to the housing 201 is contemplated herein (e.g., adhering, welding, brazing, friction fit). A press fit allows for overhaul of the parts as other components may wear out, thus sparing damage to housing 201 that would occur from the compression locking procedure.

In certain embodiments, the compression lock interface 205b can include any suitable material that is harder than the strut washer 207 such that the strut washer 207 deforms under compression against the compression lock interface 205b of the lock washer 205. For example, the compression lock interface 205b can include at least one of knurling, radial serrations, cubic boron nitride coating, aluminum oxide coating, colloidal silica, or any other suitable interface (e.g., gritty media). In certain embodiments, the lock washer 205 can be formed from a harder material than the strut washer 207.

In certain embodiments, as shown in FIGS. 3A and 3B, the compression lock interface 205b can be defined on less than all of the flat portion 205a. However, any suitable surface coverage of the compression lock interface 205b is contemplated.

At least one channel 205d can be defined in the flat portion 205a. As shown, two parallel channels 205d can be formed on opposite sides of the flat portion 205a. Any other suitable configuration for channels 205d and/or other suitable features on the flat portion 205 are contemplated herein.

Referring to FIG. 2, the strut post opening 209 can be defined through a center of the lock washer aperture 203. It is contemplated that the strut post opening 209 can be positioned away from the lock washer aperture 203 such that the lock washer aperture 203 and the strut post opening 209 are not in fluid communication. The lock washer 205 can include a post portion 205c configured to fit within the strut post opening 209 and to allow a vane post 211a to be inserted therethrough.

Figure 4:
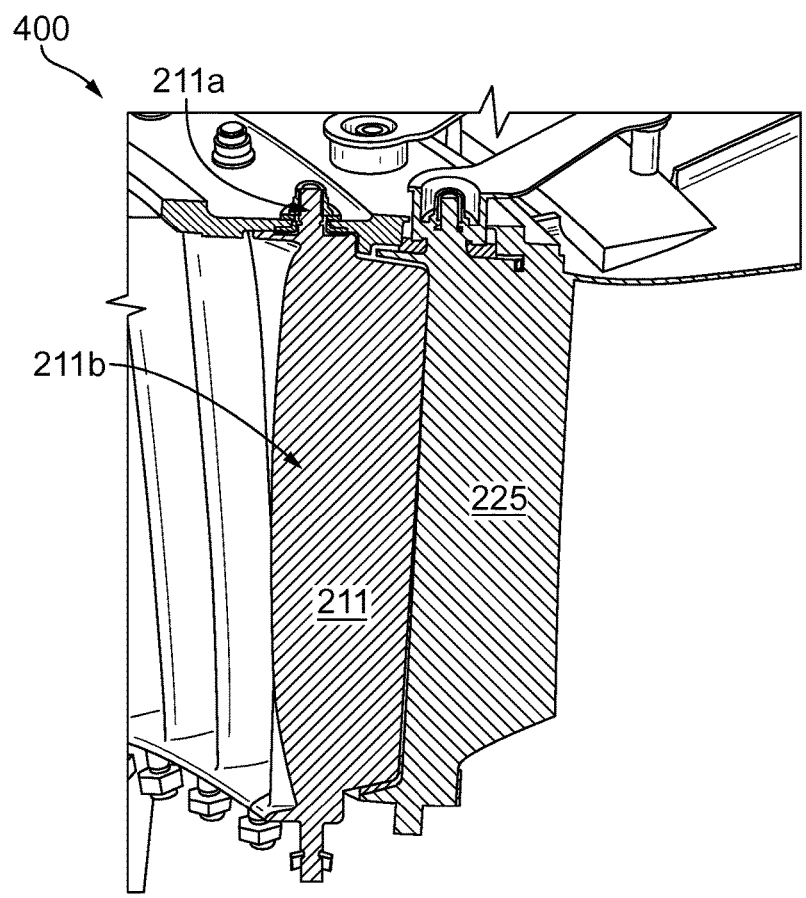
FIG. 4 is a perspective view of an embodiment of a strut-flap vane in accordance with this disclosure, showing an embodiment of a strut washer disposed thereon.

Referring additionally to FIG. 4, the system 200 can include a vane strut 211 defining a leading edge 211b of a vane airfoil, the strut including a strut post 211a and a strut washer 207 disposed in a strut washer aperture 211c thereof. The strut post 211a can include suitable threading on an outer surface thereof and be configured to mate with a locking nut 213 to compress the vane strut 211 to the housing 201. As shown, a nut washer 215 can be included in between the locking nut 213.

In certain embodiments, the strut washer 207 can be press fit into the strut washer aperture 211c, however, any suitable method of affixing the strut washer 207 to the strut 211 is contemplated herein (e.g., adhering, welding, brazing, friction fit). The strut washer 207 can be a flat washer of any suitable shape (e.g., annular). As shown, the strut washer 207 can be disposed around the strut post 211a.

In certain embodiments, the strut washer 207 can include a flat uniform surface for the compression lock interface 205b to compress against and deform. It is contemplated, however, in certain embodiments, that the strut washer 207 can include a suitable compression lock surface as described above (either in conjunction with or alternatively to the compression lock interface 205b of lock washer 205) such that the strut washer 207 can bore into a softer portion of the lock washer 205 (e.g., possibly surface 205a). For example, in certain embodiments, the lock washer 205 can include at least a portion without knurling that is softer than a compression lock interface on the strut washer 207 and also include the compression lock interface 205b to dig into a softer portion on the strut washer 207. In another embodiment, the lock washer 205 can include a flat surface similar to the strut washer 207 as shown, and the strut washer 207 can include a compression lock interface 205b as shown on lock washer 205, thus allowing for the reverse scenario that is depicted. Any other suitable surface feature for enhancing the compression lock between the lock washer 205 and the strut washer 207 is contemplated herein.

In accordance with at least one aspect of this disclosure, referring to FIGS. 2 and 4, a turbomachine for an aircraft includes a housing 201 as described above, a 400 vane including a vane strut 211 as described above and a vane flap 225 movably mounted relative to the vane strut 211 and the housing 201 to change an aerodynamic shape of the vane, and a lock washer 205 as described above.

In accordance with at least one aspect of this disclosure, a method for positioning and securing a vane strut 211 in a turbomachine housing 201 includes compressing a strut washer 207 that is disposed in a strut washer aperture 203 against a lock washer 205 that is disposed in the housing 201 such that a deformation fit is created therebetween. Compressing can include tightening a lock nut 213 around a strut post 211a disposed through the housing 201.

The method can further include positioning the vane strut 211 to a predetermined position before compressing the strut washer 207 against the lock washer 205. The method can further include press fitting the lock washer 205 into the housing 201.

Utilizing the herein disclosed embodiments allows the use of typical manufacturing tolerances for the strut 211, holes 209, and/or related components, but achieves a highly controlled gap between the strut 211 and the flap 225 by controlling the position of the strut 211 relative to the flap. An assembler can loosely installs the components into the housing 201 and positioning can be done manually with tooling, shims, etc. To achieve a tight gap, the hardware can then be torqued to secure the assembly, by the use of the lock washer 205 and/or strut washer 207 that has a compression lock interface to bite into a mating washer such that no movement occurs as the engine wears.

The methods and systems of the present disclosure, as described above and shown in the drawings, provide for vane strut positioning and locking systems with superior properties including improved gap minimization between the strut and flap of a vane. While the apparatus and methods of the subject disclosure have been shown and described with reference to embodiments, those skilled in the art will readily appreciate that changes and/or modifications may be made thereto without departing from the scope of the subject disclosure.

What is claimed is:

1. A vane strut positioning and securement system, comprising:

a housing including a washer aperture defined in an inner diameter thereof, the washer aperture defined partially through a thickness of the housing, wherein the housing further includes a strut post opening defined through the housing from the inner diameter to an outer diameter of the housing;

a lock washer disposed within the washer aperture of the housing, the lock washer configured to lock a vane strut orientation under compression against a vane strut washer, wherein the lock washer or the vane strut washer has a compression lock interface that compresses or deforms into to the other of the vane strut washer or the lock washer when the vane strut orientation is secured to the housing, wherein the compression lock interface includes material that is harder than the vane strut washer such that the vane strut washer deforms under compression against the compression lock interface of the lock washer; and a vane strut defining a leading edge of a vane airfoil, the vane strut including a strut post and the vane strut washer disposed in a strut washer aperture thereof, wherein the strut post includes threading on an outer surface thereof and is configured to mate with a locking nut to compress the vane strut to the housing.

2. The system of claim 1, wherein the strut post opening is defined through a center of the washer aperture of the housing.

3. The system of claim 1, wherein the lock washer includes a flat portion including the compression lock interface.

4. The system of claim 3, wherein the flat portion is annular.

5. The system of claim 3, wherein the lock washer includes a post portion configured to fit within the strut post opening and to allow a vane post to be inserted therethrough.

6. The system of claim 3, wherein the compression lock interface includes at least one of knurling, radial serrations, cubic boron nitride coating, aluminum oxide coating, or colloidal silica.

7. The system of claim 3, wherein the lock washer is press fit into the washer aperture of the housing.

8. A vane strut positioning and securement system, comprising:

a housing including a washer aperture defined in an inner diameter thereof, the washer aperture defined partially through a thickness of the housing, wherein the housing further includes a strut post opening defined through the housing from the inner diameter to an outer diameter of the housing;

a lock washer disposed within the washer aperture of the housing, the lock washer configured to lock a vane strut orientation under compression against a vane strut washer, wherein the lock washer or the vane strut washer has a compression lock interface that compresses or deforms into the other of the vane strut washer or the lock washer when the vane strut orientation is secured to the housing, wherein the compression lock interface includes material that is harder than the vane strut washer such that the vane strut washer deforms under compression against the compression lock interface of the lock washer; and a vane strut defining a leading edge of a vane airfoil, the vane strut including a strut post and the vane strut washer disposed in a strut washer aperture thereof, wherein the strut post includes threading on an outer surface thereof and configured to mate with a locking nut to compress the vane strut to the housing, wherein the vane strut washer is press fit into the strut washer aperture.

9. The system of claim 1, wherein the lock washer includes:
   a flat portion including the compression lock interface, the lock washer defining a strut post orifice to allow the strut post to pass therethrough; and
   a post portion extending from the strut post orifice and configured to fit within the strut post opening wherein the strut post opening is located in the housing.

10. The system of claim 9, wherein the flat portion is annular.

11. The system of claim 9, wherein the compression lock interface includes at least one of knurling, radial serrations, cubic boron nitride coating, aluminum oxide coating, or colloidal silica.

12. The system of claim 9, wherein the compression lock interface is defined on less than all of the flat portion.

13. The system of claim 9, wherein at least one channel is defined in the flat portion.

14. A turbomachine for an aircraft, comprising:
   a housing including a washer aperture defined in an inner diameter thereof, the washer aperture defined partially through a thickness of the housing, wherein the housing further includes a strut post opening defined through the housing from the inner diameter to an outer diameter of the housing;
   a vane, including:
     a vane strut defining a leading edge of a vane airfoil, the vane strut including a strut post disposed within the strut post opening and a vane strut washer disposed in a strut washer aperture thereof, wherein the strut post includes threading on an outer surface thereof and configured to mate with a locking nut to compress the vane strut to the housing; and
     a vane flap movably mounted relative to the vane strut and the housing to change an aerodynamic shape of the vane; and
   a lock washer disposed within the washer aperture of the housing, the lock washer configured to lock a vane strut orientation under compression against the vane strut washer.

15. The turbomachine of claim 14, wherein the strut post opening is defined through a center of the washer aperture of the housing.

16. The turbomachine of claim 14, wherein the lock washer includes a flat portion including a compression lock interface.

17. The turbomachine of claim 16, wherein the flat portion of the lock washer is annular.

* * * * *